United States Patent
Chander et al.

(10) Patent No.: US 10,498,724 B2
(45) Date of Patent: Dec. 3, 2019

(54) DIGITAL COMMUNITY SYSTEM

(71) Applicant: FUJITSU LIMITED, Kawasaki-shi, Kanagawa (JP)

(72) Inventors: Ajay Chander, San Francisco, CA (US); Kevin Krejci, San Francisco, CA (US); Yuji Nakajima, Sunnyvale, CA (US); Yuko Okubo, Berkeley, CA (US)

(73) Assignee: FUJITSU LIMITED, Kawasaki (JP)

( * ) Notice: Subject to any disclaimer, the term of this patent is extended or adjusted under 35 U.S.C. 154(b) by 219 days.

(21) Appl. No.: 15/389,260

(22) Filed: Dec. 22, 2016

(65) Prior Publication Data

US 2018/0183776 A1    Jun. 28, 2018

(51) Int. Cl.

| G06F 21/00 | (2013.01) |
|---|---|
| H04L 29/06 | (2006.01) |
| G06F 16/22 | (2019.01) |
| G06Q 30/06 | (2012.01) |
| G06Q 50/00 | (2012.01) |
| H04L 29/08 | (2006.01) |

(52) U.S. Cl.
CPC .......... *H04L 63/083* (2013.01); *G06F 16/22* (2019.01); *G06Q 30/0645* (2013.01); *G06Q 50/01* (2013.01); *H04L 63/10* (2013.01); *H04L 67/18* (2013.01)

(58) Field of Classification Search
CPC ....... H04L 63/083; H04L 63/10; H04L 67/18; G06F 17/30312; G06Q 30/0645; G06Q 50/01
See application file for complete search history.

(56) References Cited

U.S. PATENT DOCUMENTS

| 2016/0366122 A1* | 12/2016 | Rykowski ........... H04L 63/0815 |
| 2018/0137363 A1* | 5/2018 | Campagnoli ..... G06F 17/30811 |

OTHER PUBLICATIONS

Author: Nextdoor; "About Nextdoor"; Publisher: https://web.archive.org/web/20160122165330/https://nextdoor.com/about_us/; Date: Jan. 22, 2016; pp. 1-2 (Year: 2016).*
Extended European Search Report for corresponding application No. 17172325.7 dated Jul. 6, 2017.
EP Examination Report in application No. 17 172 325.7 dated Sep. 10, 2018.
Guesty, Inc., (https://www.guesty.com/features/) accessed Jan. 11, 2017.
Pillow Homes, (https://www.pillowhomes.com/how_it_works) accessed Jan. 11, 2017.
Handy, (https://www.handy.com/) accessed Jan. 11, 2017.
(Continued)

*Primary Examiner* — Andrew J Steinle
(74) *Attorney, Agent, or Firm* — Maschoff Brennan (57) ABSTRACT

A method includes receiving, via a network, a join request from a client device for a user to access a digital community. The join request includes a membership eligibility assertion. The method further includes verifying the membership eligibility assertion. The method also includes granting access to the digital community based on the verifying. The method includes receiving a question from the client device via a graphical user interface associated with the digital community. The method also includes identifying a solution to the question, wherein the solution includes an asset. The method further includes sending the solution to the client device via the network.

17 Claims, 6 Drawing Sheets

(56) References Cited

OTHER PUBLICATIONS

DigJapan, (https://digjapan.travel/en/) accessed Jan. 11, 2017.
Voyagin, (https://www.govoyagin.com/) accessed Jan. 11, 2017.
TaskRabbit (https://www.taskrabbit.com/how-it-works) accessed Jan. 11, 2017.
Instacart (https://www.instacart.com/) accessed Jan. 11, 2017.
Nextdoor (https://nextdoor.com/) accessed Jan. 11, 2017.
Mercari (https://www.mercari.com/) accessed Jan. 11, 2017.
Your Virtual Front Desk (http://www.yourvirtualfrontdesk.com/about2) accessed Jan. 11, 2017.
Zendesk (https://www.zendesk.com/support/) accessed Jan. 11, 2017.
EP Summons to attend oral proceedings in application No. 17172325.7 dated Feb. 1, 2019.

\* cited by examiner

DIGITAL COMMUNITY SYSTEM

FIELD

The embodiments discussed herein are related to a digital community system.

BACKGROUND

Recently, a sharing economy has developed in which individuals rent or loan assets in a peer-to-peer environment. The sharing economy may include or be referred to as a collaborative economy, a peer-to-peer (P2P) economy, on-demand economy, or collaborative consumption. In the sharing environment, assets owned by individuals may be made available for temporary use by other individuals. The temporary use may be in exchange for some monetary compensation or may be substantially free. The sharing economy may contribute to a collaborative consumption of resources in communities.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method includes receiving, via a network, a join request from a client device for a user to access a digital community. The join request includes a membership eligibility assertion. The method further includes verifying the membership eligibility assertion. The method also includes granting access to the digital community based on the verifying. The method includes receiving a question from the client device via a graphical user interface associated with the digital community. The method also includes identifying a solution to the question, wherein the solution includes an asset. The method further includes sending the solution to the client device via the network.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

A sharing economy generally includes a first party who may offer an asset (e.g., a product) for use or may have authorization to offer the asset for use by a second party. The asset may also include a service that may be rendered to the second party. As used herein, the first party is generally referred to as an owner and the second party is generally referred to as a customer. In addition to the owner and the customer, the sharing economy may include a third party. The third party may not be a direct owner of the asset but may have some association with the asset such that a use of the asset by the customer affects the third party. Generally, the third party may not receive any consideration for the effect the rental of the asset imposes on her. Additionally, in many cases, the owner may not be available when the customer uses or accesses the asset, which may make communication between the owner and the third party difficult and introduces an additional imposition on the third party.

For example, the asset may be a condominium owned by the owner and the third party may be an owner of another condominium that shares an exterior entrance with the condominium owned by the owner. When the customer is using the condominium owned by the owner, the third party may notice the presence of the customer, who may be a stranger. The third party may not know whether the customer is burglarizing the condominium owned by the owner, is a friend of the owner, or is a customer. Additionally, a code or key for the shared entrance may be provided to the customer, which may be seen as a security risk to the third party. While the owner may receive some consideration for use of the condominium, the third party often times does not. Moreover, the third party may not be aware of an agreement between the customer and the owner.

Moreover, the customer may not be familiar with the surrounding area and thus may miss various opportunities to experience assets (e.g., services and/or products) offered in the surrounding area. Further, when the owner may reside in the condominium, the owner may likewise not be aware of various opportunities in the surrounding area.

To address these and other shortcomings, some embodiments described in this disclosure include a community platform. The community platform may provide a "solve anything" platform as a service for a community. The community platform may include a mechanism to resolve issues, questions and/or problems that may arise by anyone connected to the community platform. For example, the community platform may include a set of frequently asked questions and corresponding answers, an editable multi-level solution database, an editable multi-level solution and service database, or a combination thereof. The community platform may be provided through a clear point of access (e.g., a mobile application, website). In at least one embodiment, the community platform may be referred to as a virtual concierge or a virtual front desk.

The community platform may be open to the public or may be limited to a particular community. For example, a community may be defined as any owner or occupant of a condominium in a condominium building or complex. The owner and the third party may be permanent members of the community and may have authority to grant temporary access to the community. For example, the owner may grant temporary access to the customer for a duration that the customer stays at the owner's condominium.

The community platform may address needs that arise in residential sharing situations, for example. The community platform may also address the inconveniences that may occur when customers engage neighbors (e.g., the third party) for these needs. The community platform may provide a local asset economy for the entire community to benefit from residential sharing. The presence of the community platform may lead to the discovery of local assets (e.g., micro-services) that may be provided by the service providers who are also members of the local community themselves. The community platform may be used by the existing community members themselves. Even without visitors (e.g., the customer), the discovery of local service providers may have economic and social value. Local service providers may offer services that reduce transportation costs, for example.

This and other embodiments are described with reference to the appended figures. In the figures, like numbers generally correspond to like structures unless indicated otherwise.

Figure 1:
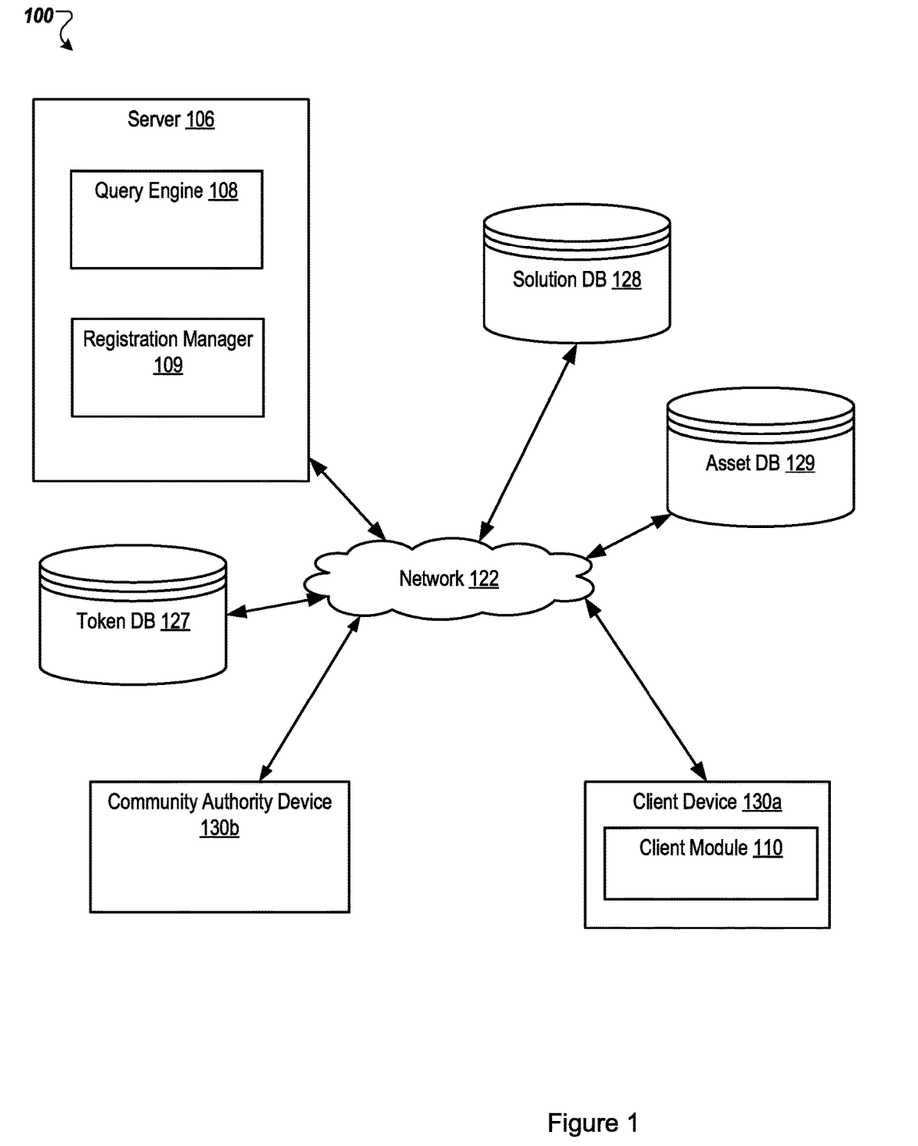
FIG. 1 illustrates a block diagram of an example operating environment of a community platform system.

FIG. 1 illustrates a block diagram of an example operating environment 100 of a community platform system, arranged in accordance with at least one embodiment described herein. The operating environment 100 includes at least one client device 130, at least one database 127, 128, 129, a server 106, and a network 122. The client devices 130, the databases 127, 128, 129, the server 106 (collectively, "environment components") may be communicatively coupled via the network 122. The environment components may communicate data and information, such as messages pertaining to questions, solutions and/or services communicated from the server 140 to the device 104 via the network 122. Each of the environment components are briefly described in the following paragraphs.

The server 106 may include a processor-based computing device. For example, the server 106 may include a hardware server or another processor-based computing device configured to function as a server. The server 106 may include memory and network communication capabilities. In the operating environment 100, the server 106 may be configured to communicate with the client device 130, and the databases 127, 128, 129 via the network 122.

The network 122 may include a wired network, a wireless network, or any combination thereof. The network 122 may include any suitable topology, configuration or configurations including a star configuration, token ring configuration, or other configurations. The network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols. In some embodiments, the network 122 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, or the like.

The databases 127, 128, 129 may include any memory or data storage. The databases 127, 128, 129 may include network communication capabilities such that the environment components may communicate with the databases 127, 128, 129. In some embodiments, the data storage 116 may include computer-readable storage media for carrying or having computer-executable instructions or data structures stored thereon. The computer-readable storage media may include any available media that may be accessed by a general-purpose or special-purpose computer, such as a processor. For example, the databases 127, 128, 129 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in the databases 127, 128, 129.

The databases 127, 128, 129 may store various data. The data may be stored in any data structure, such as a relational database structure. For example, the token DB 127 may include authentication data for a user or a user account. An electronic token may be associated with a user identifier or a user account identifier. The identifier may include an email address, a user name, etc. The token may correspond to a particular community in which case, the token may be referred to a community token. The user may join various communities which each may be associated with a different community token. Any number of tokens may be associated with the user or user account for authorization or to grant access to one or more particular communities. In another example, the solutions DB 128 may include any number of questions and any number of associated answers. For example, a question may be an inquiry on the best Thai restaurants within a given distance. Any number of answers may indicate one or more Thai restaurants. The answers may be predetermined, crowd-sourced, or a combination thereof. In a further example, the asset DB 129 may include information pertaining to any number of assets owned by individuals and which may be made available for temporary use by other individuals. The asset DB 129 may also include any number of services that may be performed by qualified entities. For example, a service may include a home cleaning service for dwellings within a given area. The services DB 129 may be associated with service providers who may perform the corresponding service, and may also include reviews and ratings of the service providers.

An asset may be associated with a solution. For example, a question may be a query for "I just bought a home. Any recommendations on things I should do next?" A solution may include a list of items that new homebuyers should do (e.g., paint the walls before moving in the furniture, sign up for water and other utilities) and may also include a service (e.g., services associated with a house cleaning service provider and/or a yard care service provider).

In the depicted embodiment, the databases 127, 128, 129 are separate from the server 106. In some embodiments, some or all of the databases 127, 128, 129 may be included in the server 106 or the server 106 may include a local data storage similar to the databases 127, 128, 129 and may access the databases 127, 128, 129 via the network 107.

The client device 130 may include a processor-based computing system. The client device 130 may include memory, a processor, and network communication capabilities. In the operating environment 100, the client device 130 may be capable of communicating and receiving data and information to and from the server 106 via the network 122. Some examples of the client device 130 may include a mobile phone, a smartphone, a tablet computer, a laptop computer, a desktop computer, a set-top box, a virtual-reality device, or a connected device, etc. The client device 130 may include one or more sensors to detect information pertaining to the user of the client device 104, an environment in which the client device 104 is situated, etc. The one or more sensors may include at least one of a clock, camera, microphone, gyroscope, accelerometer, infrared sensor, global positioning system (GPS), near-field communication (NFC) sensor, brightness sensor, proximity sensor, compass, thermometer, step counter, or fingerprint sensor, etc.

The server 106 may include a registration manager 109. The registration manager 109 may control access to various communities. In at least one embodiment, a user may wish to join a community and may submit a request to the registration manager 109 to join a particular community via a client device 130*a*. For example, an owner of a condominium may desire to join a community dedicated to condominium owners within a particular condominium complex. In at least one embodiment, a community authority may use the registration manager 109 to grant access to the community to a user (e.g., the owner). A community authority may refer to an entity who has rights to administrator membership in the community. The administrator rights may include granting, blocking, suspending or revoking temporary or permanent access to the community. The community authority may use the community authority device 103*b* to administer membership in the community. In at least one embodiment, the community authority may pre-authorize a user to join a community. Pre-authorization a user may include adding a user identifier (e.g., email address, phone number) to a white list. The user may then request to join the community and their request may be granted without further action by the community authority.

The registration manager 109 may be implemented using hardware including a processor, a microprocessor (e.g., to perform or control performance of one or more operations), an FPGA, or an ASIC. In some other instances, the registration manager 109 may be implemented using a combination of hardware and software. Implementation in software may include rapid activation and deactivation of one or more transistors or transistor elements such as may be included in hardware of a computing system (e.g., the server 106). Additionally, software defined instructions may operate on information within transistor elements. Implementation of software instructions may at least temporarily reconfigure electronic pathways and transform computing hardware.

In at least one embodiment, the registration manager 109 may request proof of community membership. Proof of community membership may be based on: a physical location (e.g., may be provided by mailings to a physical address with one-time code, a GPS location, a location determined at least partially using a Wi-Fi connection), a token provided by community authority or a delegating authority (e.g., a one-time code signed by the community authority, time-limited codes signed by a delegator), a virtual identifier (e.g., as in a co-op, employee facility, etc. For example, a delegating authority may include an owner of a condominium. The owner may grant temporary access to the community to a customer (e.g., an individual who is renting their condominium). Such techniques may enhance residence sharing by allowing customers to access a local community and may also be used to track residence sharing usage, among other aspects. In at least one embodiment, access may be at least partially defined by location of a customer or a user device. For example, geofencing techniques may be used to enforce some of the community access privileges. The community access privileges may identify that the customers, guests, or others may have access only when they are located in a certain area (such as the condo building, a specific neighborhood, or city).

The server 106 may include a query engine 108 that may be configured to receive a question or query and provide an output (e.g., a solution and/or service) in response to the question. Using the client device 130*a*, a user (e.g., owner, customer, third-party) may engage with the query engine 108 to describe a problem and access solutions and/or services.

The query engine 108 may provide or host a website or application on which a user may seek and find answers to questions or problems via the client device 130*a*. The query engine 108 may use crowd-sourced data to answer to questions or problems. The crowd-sourced data may be acquired substantially in real time or in response to receiving the question or problem. For example, another user may attempt to resolve the question or problem using the query engine 108 and/or any of the databases 127, 128, 129. In another embodiment, the query engine 108 may be machine powered. The query engine 108 may allow the user to choose from a set of questions whose answers may be in one more of the databases 127, 128, 129 or from any other source. In a further embodiment, the query engine 108 may be hybrid powered (e.g., both machine powered and may also include a forum populated by community users). In at least one embodiment, the query engine 108 may provide a list of frequently asked questions (FAQ), which may include a set of questions and answers, which can be used by a person or a machine to respond to a question or problem.

The query engine 108 may be implemented using hardware including a processor, a microprocessor (e.g., to perform or control performance of one or more operations), an FPGA, or an ASIC. In some other instances, the query engine 108 may be implemented using a combination of hardware and software. Implementation in software may include rapid activation and deactivation of one or more transistors or transistor elements such as may be included in hardware of a computing system (e.g., the server 106). Additionally, software defined instructions may operate on information within transistor elements. Implementation of software instructions may at least temporarily reconfigure electronic pathways and transform computing hardware.

The solution DB 128 may include an editable multi-level solution database. The solution DB 128 may provide answers to questions. For example, the solution DB 128 may provide an answer to the question "where is the best laundromat?" The solution DB 128 may be editable by other users. In at least one embodiment, users that belong to a particular community may add or edit answers to questions or problems that are related to the community. Similarly, users that belong to a community may add new questions with answers to the solution DB 128. Further, the solution DB may be multi-level. For example, a multi-level DB may include a multi-level hierarchy of answer authorities for each user. Answers that are provided by a highest level answer authority may be provided to the user before answers provided by lower level answer authorities. For example, a host may have temporary visitors in his home. The host may be the highest level answer authority for the visitors and may be the first entity to provide answers to the visitors.

The asset DB 129 may include an editable multi-level asset DB 129. The asset DB 129 may extend the solution DB 128 with assets (e.g., products, services). In at least one embodiment, the solution DB 128 and the asset DB 129 may be combined in a single database. For example, the asset DB 129 may provide services as answers to questions or problems. For example, for the question "Where is the closest laundromat?", a service answer may indicate one or more service providers in the community (or outside of the community) who may offer to do someone's laundry for a certain price. The services in the asset DB 129 may be provided as service offerings. For example, a community member may offer to bake their home-cooked banana bread for anyone else in the community. The community member may also offer to sell the recipe to anyone else in the community.

As illustrated, the query engine 108 may be hosted on the server 106. In at least one embodiment, the query engine 108 may be at least partially executed on a client device 130. For example, a user may download a stand-alone application (e.g., client module 110) from an application store or a web-based application. The client module 110 may also be accessed via a dedicated phone number, text message group, or any other communication channel.

Modifications, additions, or omissions may be made to the environment 100 without departing from the scope of the present disclosure. For example, the present disclosure applies to an operating environment 100 including one or more devices 130 that may be associated with one or more parties, one or more servers 106, one or more databases 127, 128, 129, or any combination thereof.

Moreover, the separation of various components in the embodiments described herein is not meant to indicate that the separation occurs in all embodiments. Additionally, it may be understood with the benefit of this disclosure that one or more of the described components may be integrated together in a single component or separated into multiple components.

FIGS. 2-5 illustrate flow diagrams of example methods related to a community platform. The methods may be performed by processing logic that may include hardware (circuitry, dedicated logic, etc.), software (such as is run on a general purpose computer system or a dedicated machine), or a combination of both, which processing logic may be included in the operating environment 100 of FIG. 1, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Figure 2:
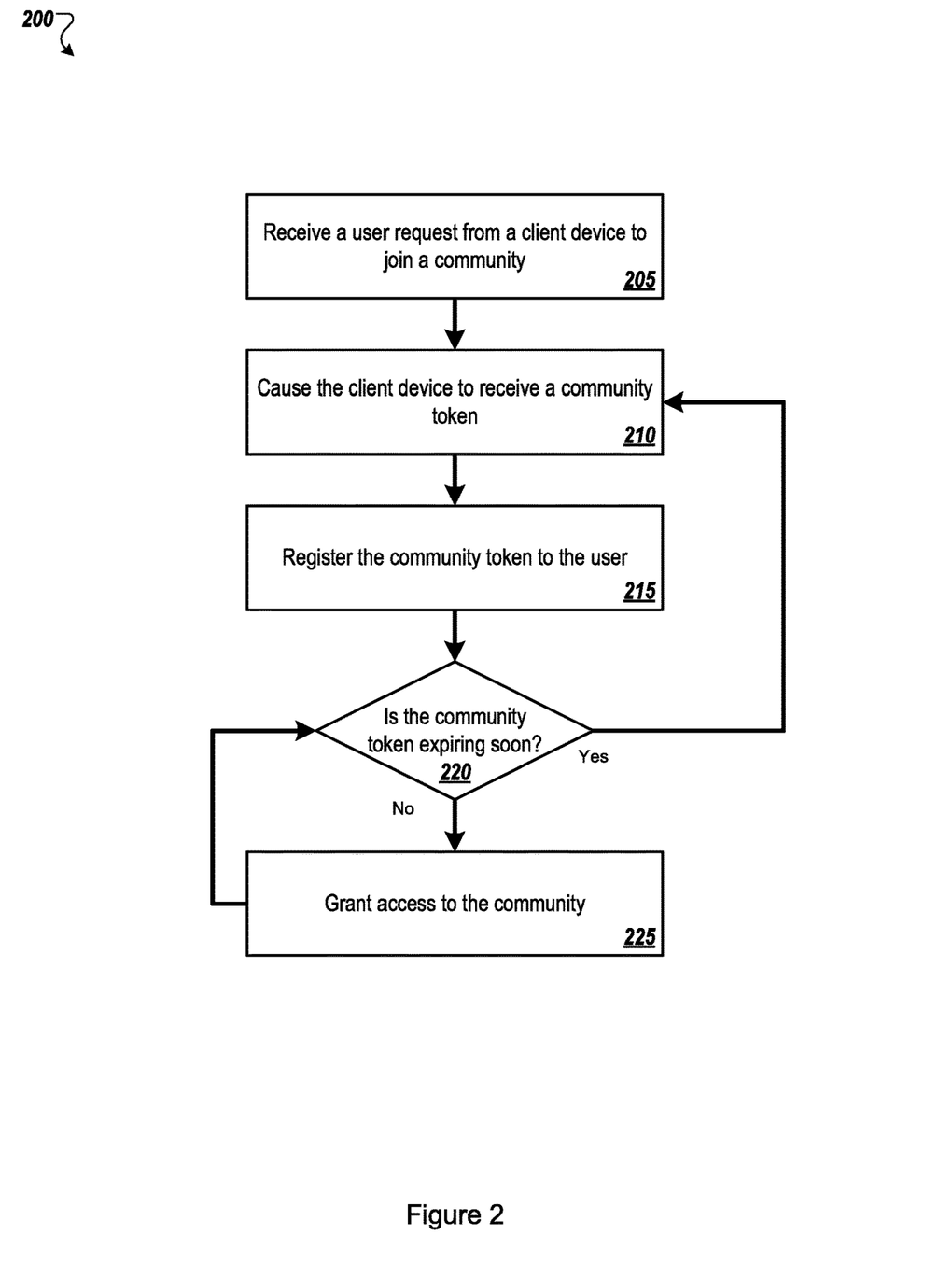
FIG. 2 illustrates a flow diagram of an example method to receive a request to join a community provided by a community platform.

FIG. 2 illustrates a flow diagram of an example method 200 to receive a request to join a community provided by a community platform. The method 200 may be performed, at least in part, by processing logic in a server, such as the server 106 of FIG. 1.

The method 200 may begin at block 205, where the processing logic may receive a user request from a client device to join a community. The user may be the owner, customer, third-party, or another user. The user may use the client device to browse a landing page for the community. The landing page may include information about the community, such as a title, a subject, information about who may join, the bounds of membership, pictures, text, etc. The landing page may also include an interface tool (e.g., a graphical user interface (GUI) button by which the user may submit a request to join the community. The user may activate the interface tool and a request to join the community may be sent to the processing logic.

At block 210, the processing logic may cause the client device to receive a community token. The processing logic may identify the community token for the user. The community token may be a group token that may be sent to and used by anyone in the community. Alternatively, the community token may be a single-use or single-user token that may provide the user with access to the community. In at least one embodiment, the processing logic may send a community authority or a delegating authority with the user request. The community authority or the delegating authority may provide authorization input to permit the user to join the community. The community token may be sent to the client device in response to receiving the authorization input. The community token may be valid for a predetermined amount of time and may be set by the community authority and/or the delegating authority. In an example, an owner may offer their house, via a homesharing platform, for rent to a customer for a particular length of stay. A community token may be generated for the customer. The community token may be valid for the particular length of stay, after which it may expire. In at least one embodiment, the community authority or delegating authority may renew or extend the duration of the community token before or after it has expired.

At block 215, the processing logic may register the community token to the user. The processing logic may store the community token in association with a user identifier in a data storage (e.g., token DB 127 of FIG. 1). The request to join the community may also include user information (e.g., username, password, email address, phone number) and/or device information (e.g., MAC address, UUID, UDID). The processing logic may register this user information and/or device information in a user entry in association with the community token in the data storage. The processing logic may also set an expiration condition (e.g., time-based, use-based) for the community token and may store the expiration condition in the data storage.

At block 220, the processing logic may determine whether the community token is expiring soon. At any time, the processing logic may determine whether the community token is expiring soon. To determine whether the community token is expiring soon, the processing logic may identify the expiration condition in the data storage and determine whether the expiration condition has been met, or is nearly met. For example, in a use-based scenario, the expiration condition may be met after the expiration condition has been used a predetermined number of times. For a time-based scenario, the expiration condition may be met once a certain time and date has been met. In either scenario, when the number of uses is approaching or when the time and date is approaching, the processing logic may determine that the community token is expiring soon. When the community token is expiring soon or after the community token has expired ("YES" at block 220), the processing logic may proceed to block 210.

When the community token is not expiring soon and/or has not expired ("NO" at block 220), the processing logic may grant access to the user to access the community. In at least one embodiment, the processing logic may update the user entry for the user that indicates that the user is permitted to access the community. Any devices registered to the user, as indicated in the user entry, may be permitted to access the community.

Figure 3:
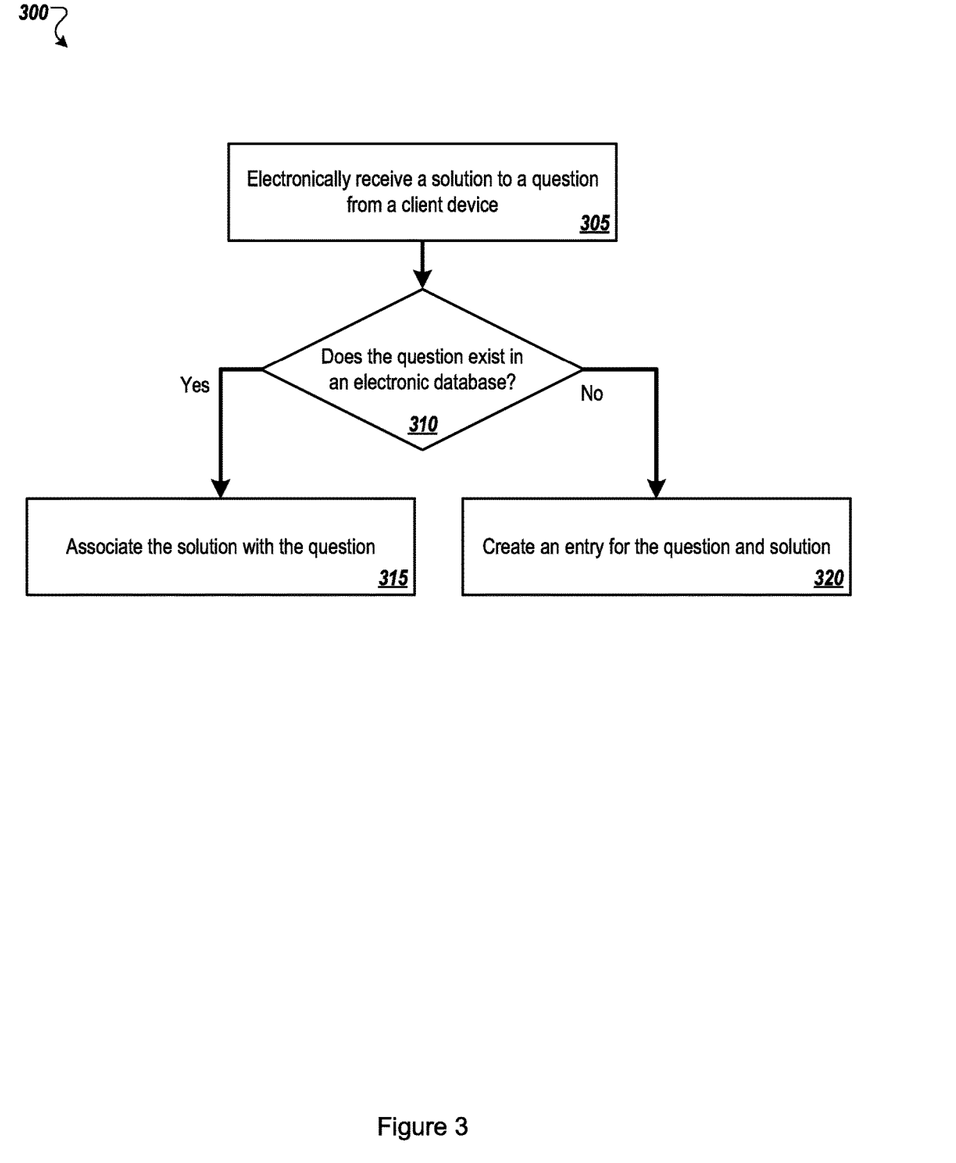
FIG. 3 illustrates a flow diagram of an example method to register a solution to a question with a query engine.

FIG. 3 illustrates a flow diagram of an example method 300 to register a solution to a question with a query engine (e.g., the query engine 108 of FIG. 1). The method 300 may be performed, at least in part, by processing logic in a server device, such as the server 106 of FIG. 1. The server 106 may include or may be communicatively coupled to a non-transitory computer-readable medium having stored thereon or encoded therein programming code or instructions that are executable by a processor to perform or cause performance of the method 300. Additionally or alternatively, the server 106 may include a processor that is configured to execute computer instructions to perform or control performance of the method 300. Although illustrated as discrete blocks, various blocks may be divided into additional blocks, combined into fewer blocks, or eliminated, depending on the desired implementation.

The method 300 may begin at block 305, where the processing logic may electronically receive a solution to a question from a client device. The solution may be received as user input to the client device. In at least one embodiment, the solution may be sent to the processing logic responsive to a user (e.g., an expert) who has viewed a question and has provided an answer. In at least one alternative embodiment, the expert may submit a question and a corresponding answer. The solution may be received in any format, such as an electronic document. In response to receiving the solution, the processing logic may identify a question that corresponds to the solution. In at least one embodiment, the solution received comes already associated with the question (e.g., when the expert directly responds to a question and provides the solution as such). In such embodiments, the question may include a question identifier (ID) and the solution may be associated with the question ID. In at least one embodiment, the processing logic may identify one or more keywords associated with the question. For example, the processing logic may extract or scrape a text-based solution to identify keywords. The keywords may be used to categorize the solution and to group the solution with other similar solutions and with one or more questions. Similarly, the processing logic may extract or scrape a text-based question to identify keywords. The keywords may be used to categorize the question and to group the question with other similar questions.

At block 310, the processing logic may determine whether the question exists in an electronic database (e.g., the solution DB 128 of FIG. 1). The processing logic may use solution keywords to identify a question with similar keywords. The processing logic may also identify a question ID associated with the solution. When the processing logic determines that the question exists in the electronic database ("YES" at block 310), at block 315, the processing logic may associate the solution with the question. When the processing logic determines that the question does not exist in the electronic database ("NO" at block 310), at block 320, the processing logic may create an entry for the question and solution in the electronic database.

Figure 4:
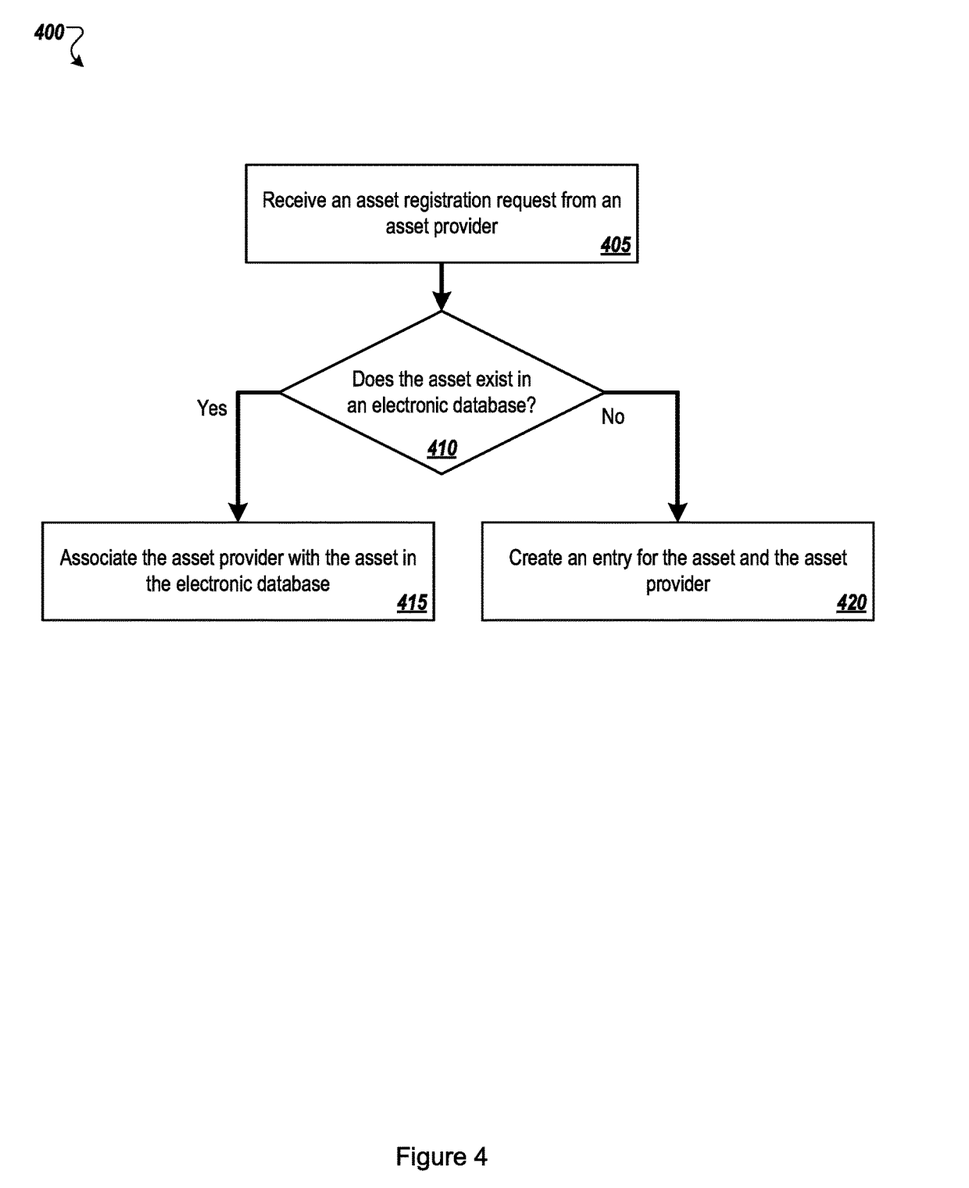
FIG. 4 illustrates a flow diagram of an example method to register an asset related to a question with a query engine.

FIG. 4 illustrates a flow diagram of an example method 400 to register an asset related to a question with a query engine (e.g., the query engine 108 of FIG. 1). The method 400 may be performed, at least in part, by processing logic in a server device, such as the server 106 of FIG. 1. The server 106 may include or may be communicatively coupled to a non-transitory computer-readable medium having stored thereon or encoded therein programming code or instructions that are executable by a processor to perform or cause performance of the method 400. Additionally or alternatively, the server 106 may include a processor that is configured to execute computer instructions to perform or control performance of the method 400. Although illustrated as discrete blocks, various blocks may be divided into additional blocks, combined into fewer blocks, or eliminated, depending on the desired implementation.

The method 400 may begin at block 405, where the processing logic may receive an asset (e.g., service) registration request from an asset provider client device. The asset registration request may be received as user input to the service provider client device. In at least one embodiment, the asset registration request may be sent to the processing logic responsive to a user (e.g., a service provider) who has viewed a question and may be able to provide a service that corresponds with the question. For example, a question may include "Any tips on what type of tile to use in a bathroom?" The service provider may be a professional tiler and may submit, via the service provider client device, information about his ability to lay tile. The service registration request may be received in any format, such as an electronic document. In at least one embodiment, the processing logic may identify one or more keywords associated with the asset. For example, the processing logic may extract or scrape a text-based asset registration request to identify keywords. The keywords may be used to categorize the service and to group the asset with other assets, services, solutions and with one or more questions. The service provider may select one or more questions with which the solution may be associated.

At block 410, the processing logic may determine whether the asset exists in an electronic database (e.g., the asset DB 129 of FIG. 1). The processing logic may use asset keywords to identify an asset with similar keywords. The processing logic may also identify or generate an asset category or ID for the answer. When the processing logic determines that the asset exists in the electronic database ("YES" at block 410), at block 415, the processing logic may associate the asset provider with the asset. In at least one embodiment, the processing logic may assign an ID to the asset provider and may store the ID in association with the asset in the asset DB 129. When the processing logic determines that the asset does not exist in the electronic database ("NO" at block 410), at block 420, the processing logic may create an entry for the asset and asset provider in the electronic database.

Figure 5:
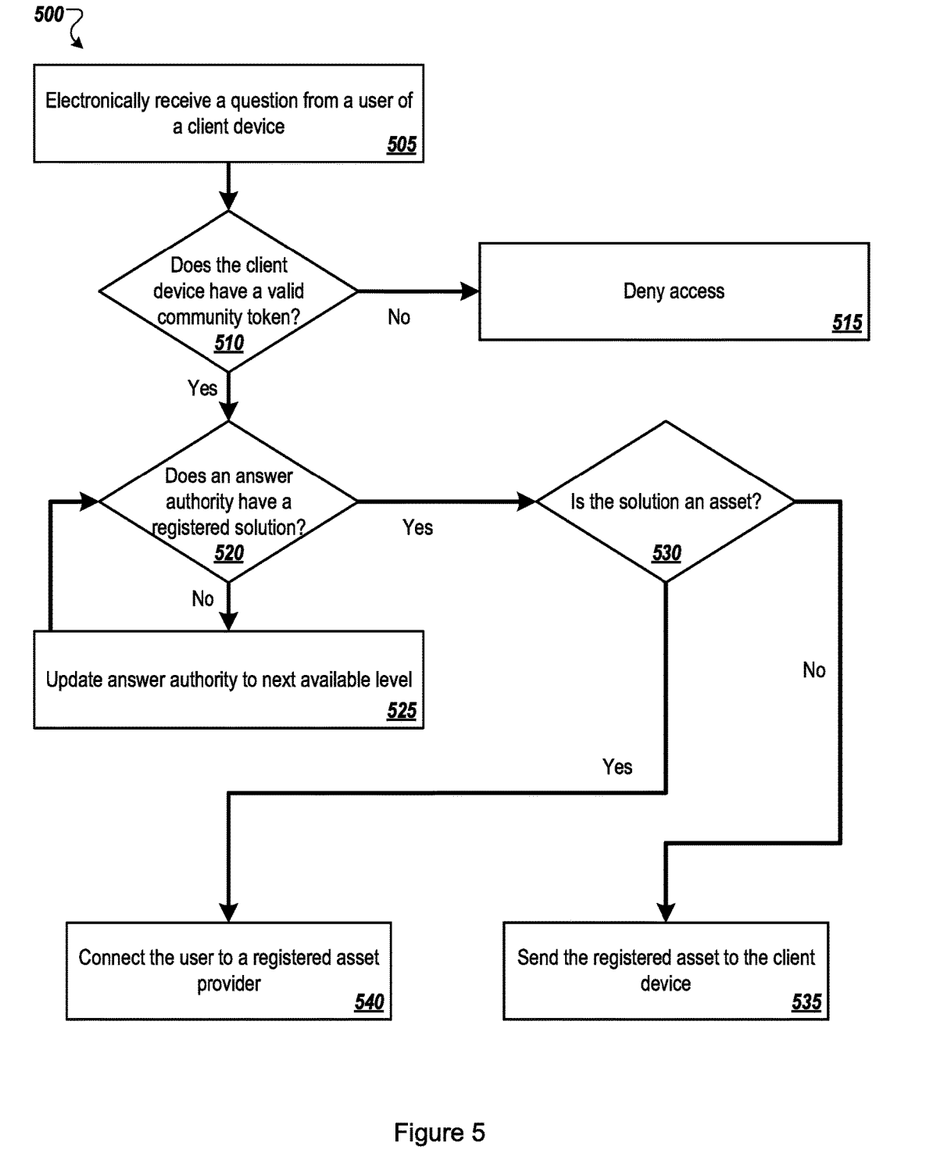
FIG. 5 illustrates a flow diagram of an example method to provide a solution and/or an asset to a user in response to a user question.

FIG. 5 illustrates a flow diagram of an example method 500 to provide a solution and/or an asset to a user in response to a user question. The method 500 may be performed in an operating environment such as the operating environment 100 of FIG. 1. The method 500 may be performed, at least in part, by processing logic in a server, such as the server 106 of FIG. 1. The server 106 may include or may be communicatively coupled to a non-transitory computer-readable medium having stored thereon or encoded therein programming code or instructions that are executable by a processor to perform or cause performance of the method 500. Additionally or alternatively, the server 106 may include a processor that is configured to execute computer instructions to perform or control performance of the method 500. Although illustrated as discrete blocks, various blocks may be divided into additional blocks, combined into fewer blocks, or eliminated, depending on the desired implementation.

The method 500 may begin at block 505, where the processing logic may electronically receive a question from a user of a client device. The processing logic may provide a portal or user interface (e.g., a forum) through with the user may submit a question. The question may include any comment or phrase that may illicit a response. In at least one embodiment, the user may join a particular community and may submit the question such that only other members of that particular community may view or answer the question.

At block 510, the processing logic may determine whether the client device is associated with a valid community token. The client device may have previously received a community token, as further described in conjunction with FIG. 2. The community token may include a username/password pair, a cookie or other digital file that may be used to authenticate the client device when attempting to access (e.g., post a question to) the community. Any type of authentication may be used, such as by using blockchain, biometrics, and/or a verification of other $3^{rd}$ party systems like (e.g., Checkr™). When the client device does not have a valid community token ("NO" at block 510), at block 515, the processing logic may deny access to the client device.

When the client device has a valid community token ("YES" at block 510), at block 515, the processing logic may identify an answer authority that may have a registered solution. For example, an answer authority may have submitted a solution to the same or similar question as the question received at block 505.

At block 520, the processing logic may determine whether an answer authority may have a registered solution. The answer authority may be an individual or user account that is in a position to better provide answers to users within their community. For example, the answer authority may include a building manager of an apartment complex and the community may include individuals who live in the apartment complex. The building manager may be a good resource for questions related to the apartment complex. There may be more than one answer authority. For example, there may be multiple building managers of the apartment complex. Further, an answer authority of general knowledge (not necessarily related to the apartment complex) may also have registered solutions to the question. The answer authorities may be structured in tiers, with the first tier being a set of answer authorities who are mostly likely to be able to answer questions for a community or who are in a position or have a relationship with the community to be able to provide meaningful answers or solutions.

When the answer authority does not have a registered solution ("NO" at block 520), at block 525, the processing logic may update the answer authority to a next available level. Continuing the above example, if a primary building manager does not have a registered solution, the processing logic may select a secondary building manager. The processing logic may determine whether a secondary building manager has a registered solution at block 520.

When the answer authority has a registered solution ("YES" at block 520), at block 530, the processing logic may determine whether the registered solution is an asset. To determine whether the registered solution is an asset, the processing logic may query a data storage (e.g., asset DB 129 of FIG. 1) to locate an entry for the answer. The entry may include an asset indicator when the answer is a question. The processing logic may identify the asset indicator to determine that the registered solution is an asset.

When the registered solution is not an asset or does not include an asset ("NO" at block 530), at block 535, the processing logic may send the registered solution to the client device. To send the registered solution to the client device, the processing logic may send the answer as message (e.g., email, text message, SMS), or may allow access to a web-based location to the client device, among others.

When the registered solution is an asset ("YES" at block 530), at block 540, the processing logic may connect the user to a registered asset provider. The processing logic may identify one or more registered asset providers who are associated with the asset. The one or more registered asset providers may have additional metadata, such as location, cost, user reviews, etc. The processing logic may select one of the asset providers based on the metadata. For example, the processing logic may select the closest registered asset provider based on the location of the client device (or based on a user-input location). The processing logic may connect the user to the registered asset provider by sending a message (e.g., email, text message, SMS) to the client device, or may allow access to a web-based location (e.g., a service provider page in the community) to the client device, among others.

Figure 6:
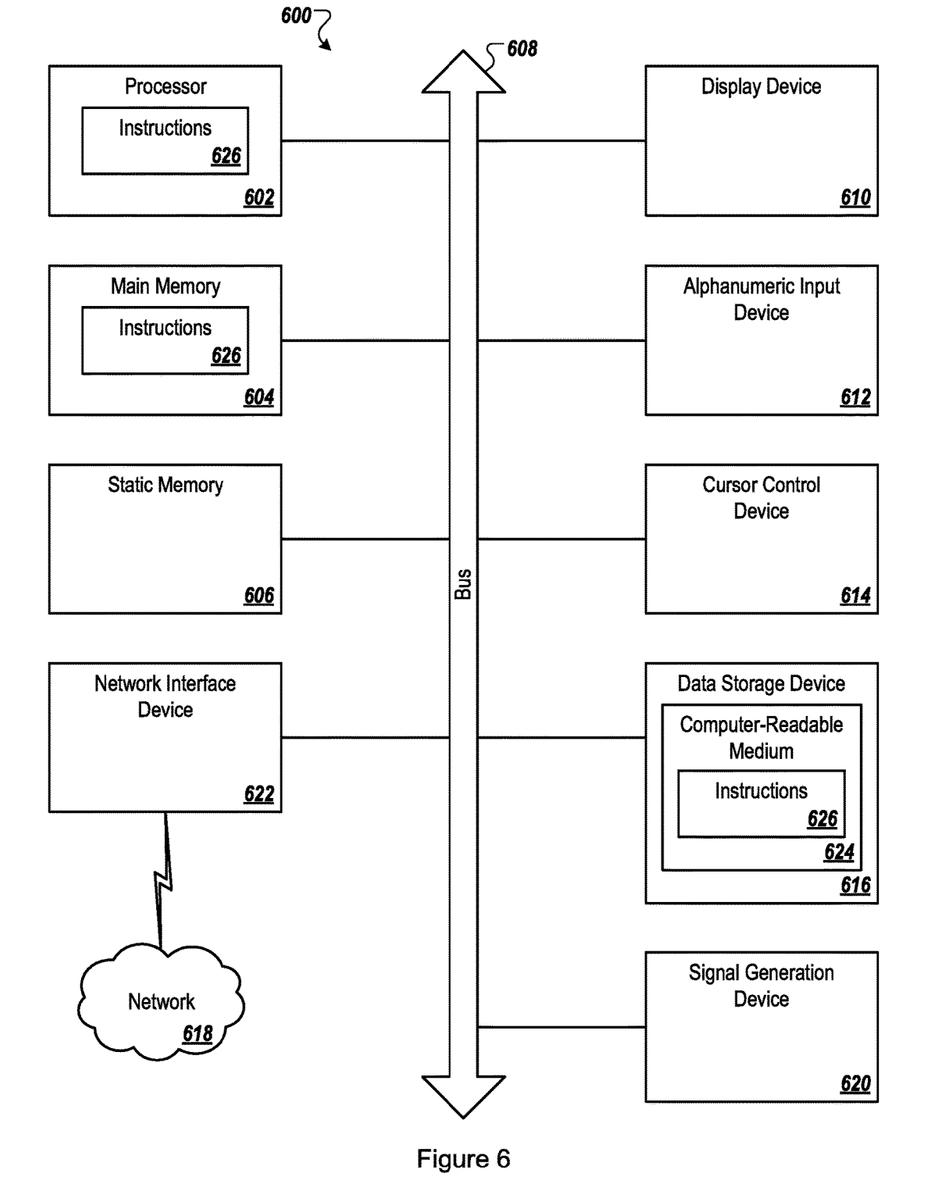
FIG. 6 illustrates a diagrammatic representation of a machine in the example form of a computing device within which a set of instructions, for causing the machine to perform any one or more of the methods discussed herein, may be executed, all arranged in accordance with at least one embodiment described herein.

FIG. 6 illustrates a diagrammatic representation of a machine in the example form of a computing device 600 within which a set of instructions, for causing the machine to perform any one or more of the methods discussed herein, may be executed. The computing device 600 may include a mobile phone, a smart phone, a netbook computer, a rack-mount server, a router computer, a server computer, a personal computer, a mainframe computer, a laptop computer, a tablet computer, a smart watch, an augmented reality device, a virtual reality device, a desktop computer, or any type of computing device with a human-machine interface, etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 600 includes a processing device (e.g., a processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 616, which communicate with each other via a bus 608.

Processing device 602 represents one or more general-purpose processing devices such as a microprocessor, central processing unit, or the like. More particularly, the processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also include one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computing device 600, for example, may execute the instructions 626 to implement the server 106.

The computing device 600 may further include a network interface device 622 which may communicate with a network 618. The computing device 600 also may include a display device 610 (e.g., a liquid crystal display (LCD) or a cathode ray tube (CRT)), an alphanumeric input device 612 (e.g., a keyboard), a cursor control device 614 (e.g., a mouse) and a signal generation device 620 (e.g., a speaker). In one implementation, the display device 610, the alphanumeric input device 612, and the cursor control device 614 may be combined into a single component or device (e.g., an LCD touch screen). Other interfaces of the computing device 600 may include voice, touch screen, motion-detection, and other interfaces.

The data storage device 616 may include a computer-readable storage medium 624 on which is stored one or more sets of instructions 626 (e.g., operating environment 100 of FIG. 1) embodying any one or more of the methods or functions described herein. The instructions 626 may also reside, completely or at least partially, within the main memory 604 and/or within the processing device 602 during execution thereof by the computing device 600, the main memory 604 and the processing device 602 also constituting computer-readable media. The instructions may further be transmitted or received over a network 618 via the network interface device 622.

While the computer-readable storage medium 626 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Modifications, additions, or omissions may be made to any of the methods described without departing from the scope of the present disclosure. Specifically, any of the methods described may include more or fewer blocks. Further, the blocks in any of the methods described may be arranged in a different order. For example, the method 400 may omit any two of blocks 405, 410 and 415 and may also perform operations described in blocks 405, 410 and 415 in any order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method comprising:
   receiving a first electronic join request from a first client device of a first user to join a digital community;
   granting the first electronic join request by providing, to the first client device, access to the digital community;

selecting the first client device to act as a digital community authority;
causing the first client device to receive an electronic community token that permits the first client device to grant, to one or more other devices, access to the digital community;
receiving, via a network, a second electronic join request from a second client device for a second user to access a digital community, wherein the second electronic join request includes a membership eligibility assertion, wherein the electronic membership eligibility assertion includes the electronic community token, wherein the electronic membership eligibility assertion is based on a location of the second user or of the second client device;
verifying the electronic membership eligibility assertion by checking in a first electronic data storage to determine whether the electronic community token is valid or is expired;
granting, to the second client device, access to the digital community based on a determination that the electronic community token is valid;
receiving a question from the second client device via a graphical user interface associated with the digital community;
identifying a solution to the question, wherein the solution includes an asset; and
sending the solution to the second client device via the network.

2. The method of claim 1, wherein the electronic community token is valid for a predetermined amount of time set by the community authority.

3. The method of claim 1, wherein granting access to the digital community comprises providing the graphical user interface to the second client device, wherein the graphical user interface is configured to permit the user to digitally interact with other community members.

4. The method of claim 1, further comprising:
receiving a registration request from an asset provider;
receiving the solution to the question from the asset provider; and
storing the solution in a data storage, wherein the solution is identified from the data storage.

5. The method of claim 4, wherein the data storage includes a multi-level editable database.

6. The method of claim 4, wherein the asset provider is a member of the digital community.

7. A non-transitory computer-readable medium having encoded therein programming code executable by a processor to perform or control performance of operations comprising:
receiving a first electronic join request from a first client device of a first user to join a digital community;
granting the first electronic join request by providing, to the first client device, access to the digital community;
selecting the first client device to act as a digital community authority;
causing the first client device to receive an electronic community token that permits the first client device to grant, to one or more other devices, access to the digital community;
receiving a second electronic join request from a second client device for a second user to access a digital community, wherein the second electronic join request includes a membership eligibility assertion, wherein the electronic membership eligibility assertion includes the electronic community token;
verifying the electronic membership eligibility assertion by checking in a first electronic data storage to determine whether the electronic community token is valid or is expired;
granting, to the second client device, access to the digital community based on a determination that the electronic community token is valid, wherein granting access to the digital community comprises providing the graphical user interface to the second client device, wherein the graphical user interface is configured to permit the second user to digitally interact with other community members;
receiving a question from the second client device via a graphical user interface associated with the digital community;
identifying a solution to the question, wherein the solution includes an asset; and
sending the solution to the second client device.

8. The non-transitory computer-readable medium of claim 7, wherein the electronic membership eligibility assertion is based on a location of the user or of the second client device.

9. The non-transitory computer-readable medium of claim 7, wherein the electronic community token is valid for a predetermined amount of time set by the community authority.

10. The non-transitory computer-readable medium of claim 7, the operations further comprising:
receiving a registration request from an asset provider;
receiving the solution to the question from the asset provider; and
storing the solution in a data storage, wherein the solution is identified from the data storage.

11. The non-transitory computer-readable medium of claim 10, wherein the data storage includes a multi-level editable database.

12. The non-transitory computer-readable medium of claim 10, wherein the asset provider is a member of the digital community.

13. A system, comprising;
a memory; and
a processor operatively coupled to the memory, the processor being configured to perform operations comprising:
receive a first electronic join request from a first client device of a first user to join a digital community;
grant the first electronic join request by providing, to the first client device, access to the digital community;
select the first client device to act as a digital community authority;
cause the first client device to receive an electronic community token that permits the first client device to grant, to one or more other devices, access to the digital community;
receive, via a network, a second electronic join request from a second client device for a second user to access a digital community, wherein the second electronic join request includes a membership eligibility assertion, wherein the electronic membership eligibility assertion includes the electronic community token;
verify the electronic membership eligibility assertion by checking in a first electronic data storage to determine whether the electronic community token is valid or is expired;

grant, to the second client device, access to the digital community based on a determination that the electronic community token is valid;

receive a question from the second client device via a graphical user interface associated with the digital community;

identify a solution to the question, wherein the solution includes an asset;

send the solution to the second client device via the network;

receive a registration request from an asset provider;

receive the solution to the question from the asset provider; and store the solution in a data storage, wherein the solution is identified from the data storage, wherein the data storage includes a multi-level editable database.

14. The system of claim 13, wherein the electronic membership eligibility assertion is based on a location of the user or of the second client device.

15. The system of claim 13, wherein the electronic community token is valid for a predetermined amount of time set by the community authority.

16. The system of claim 13, wherein when granting access to the digital community, the processor is configured to provide a graphical user interface to the second client device, wherein the graphical user interface is configured to permit the user to digitally interact with other community members.

17. The system of claim 13, wherein the asset provider is a member of the digital community.

* * * * *